(12) United States Patent
Holtmann et al.

(10) Patent No.: US 6,358,167 B1
(45) Date of Patent: Mar. 19, 2002

(54) CONTINUOUSLY VARIABLE CHAIN-BELT TRANSMISSION

(75) Inventors: Ludger Holtmann, Karlsruhe; Michael Reuschel, Bühl, both of (DE)

(73) Assignee: LuK Lamellen und Kupplungsbau GmbH, Buhl/Baden (DE)

(*) Notice: Subject to any disclaimer, the term of this patent is extended or adjusted under 35 U.S.C. 154(b) by 11 days.

(21) Appl. No.: 09/643,027

(22) Filed: Aug. 21, 2000

(30) Foreign Application Priority Data

Aug. 20, 1999 (DE) .......................... 199 39 436

(51) Int. Cl.$^7$ .......................... F16H 59/00; F16H 61/00; F16H 63/00; B60K 41/12
(52) U.S. Cl. .......................... 474/28; 474/18; 477/39
(58) Field of Search .......................... 477/39, 45, 48, 477/98; 474/18, 28

(56) References Cited

U.S. PATENT DOCUMENTS

| | | | |
|---|---|---|---|
| 4,458,318 A | * | 7/1984 | Smit et al. ................ 474/18 X |
| 4,649,486 A | * | 3/1987 | Oshiage ..................... 701/61 |
| 4,811,225 A | * | 3/1989 | Petzold et al. ............ 477/39 X |
| 5,111,718 A | * | 5/1992 | Iizuka ..................... 477/158 X |
| 5,217,412 A | * | 6/1993 | Indlekofer et al. ......... 474/28 X |
| 6,068,565 A | * | 5/2000 | Riemer et al. ............... 474/18 |
| 6,243,638 B1 | * | 6/2001 | Abo et al. |

* cited by examiner

Primary Examiner—David A. Bucci
Assistant Examiner—Marcus Charles
(74) Attorney, Agent, or Firm—Darby & Darby

(57) ABSTRACT

In a continuously variable chain-belt transmission, a ratio-controlling pressure is selectively applied to either one or the other of two pairs of conical disks, while a belt-tightening contact pressure is applied equally in a torque-dependent amount to both disk pairs. A pump pressure generated by a pump is regulated by an offset pressure valve to a pressure level that exceeds the ratio-controlling pressure by a preset amount and at least equals the contact pressure. A current-controlled ratio-controlling valve device directs the ratio-controlling pressure to one or the other of the disk pairs depending on whether the ratio-controlling current is above or below a neutral value. The neutral current value as well as the algorithm describing the functional relationship between the ratio-controlling pressure and the current are continuously updated while the transmission is in use.

10 Claims, 2 Drawing Sheets

CONTINUOUSLY VARIABLE CHAIN-BELT TRANSMISSION

The invention relates to a method of improving the efficiency of a continuously variable chain-belt transmission with two pairs of conically tapered disks and a chain belt transmitting torque of a variable magnitude from one to the other of the pairs of conically tapered disks. The chain belt is held tight by compressive contact with the conically tapered disks, with a belt-tightening contact pressure being applied to both pairs of disks dependent on the magnitude of the torque to be transmitted. A ratio-controlling pressure is applied to either one or the other of the pairs of conical disks dependent on a transmission ratio to be set. A pump pressure is generated by a pump and regulated to a pressure level that exceeds the ratio-controlling pressure by a preset amount and at least equals the belt-tightening contact pressure. A ratio-controlling valve device, responsive to a ratio-controlling current that is variable in a continuous range extending above and below a neutral value, directs the ratio-controlling pressure to one of the pairs of conical disks when the ratio-controlling current is above the neutral value and to the other of the pairs of conical disks when the ratio-controlling current is below the neutral value.

The invention further relates to a continuously variable chain-belt transmission with two pairs of conically tapered disks and a chain belt transmitting torque from one to the other of the pairs of conically tapered disks. The chain belt is held tight by compressive contact with the conically tapered disks. Each of the pairs of disks, has a first piston/cylinder unit energized by a belt-tightening contact pressure and a second piston/cylinder unit energized by a ratio-controlling pressure. A ratio-controlling valve device directs the ratio-controlling pressure to one or the other of the second piston/cylinder units in response to a ratio-controlling current, so that the ratio-controlling pressure is directed to one of the pairs of conical disks when the ratio-controlling current is above a neutral value and to the other of the pairs of conical disks when the ratio-controlling current is below the neutral value. The transmission also has a torque-sensor device controlling the belt-tightening pressure dependent on the magnitude of the torque to be transmitted. A pump generates a pump pressure, with an offset-pressure valve regulating the pump pressure to a pressure level that exceeds the ratio-controlling pressure by a preset amount and at least equals the belt-tightening contact pressure. An electronic control device equipped with sensors is used to monitor certain operational parameters of the transmission and to regulate the ratio-controlling current so that a transmission ratio is set according to a predetermined functional relationship between the operational parameters and the transmission ratio.

A continuously variable chain-belt transmission that fits the foregoing generic description is known, e.g., from DE 19546294 A1. As an important concept in this kind of a transmission, the conical disks of each disk pair are pushed against the chain belt by a force whose magnitude depends on the torque being transmitted by the transmission. The benefit derived from this concept is that the compressive forces gripping the chain belt are in each case only as large as is necessary for slip-free operation. This increases the useful lifetime of the transmission and cuts down on the power consumption of the pump that supplies the pressure required to generate the compressive belt-gripping forces. The transmission ratio is shifted by means of a ratio-controlling valve that selectively increases the pressure at one or the other of the disk pairs. The disks of the pair receiving the increased pressure will be pushed axially closer together while the disks of the other pair will be pushed farther apart by the chain belt, the result being a change of the transmission ratio.

The ratio-controlling valve is controlled by a ratio-controlling current which, in general, is the sum of a pre-biased component and a variable control component. The level of the ratio-controlling current where neither of the two pairs of conical disks is supplied with ratio-controlling pressure is of critical importance for the degree of efficiency or, expressed in another way, the power losses of the continuously variable chain-belt transmission. For example, when a vehicle equipped with a continuously variable chain-belt transmission is waiting at a traffic light, the disk pairs should be in their neutral position, i.e., no ratio-controlling pressure should be applied to either of the disk pairs. If this is not the case, the hydraulic system or, more specifically, the pressure-generating pump will consume more power than necessary. If furthermore the vehicle has a start-up clutch arranged on the output side of the continuously variable chain-belt transmission, the friction-based power losses in the idling transmission will cause an additional increase in fuel consumption.

The neutral value of the ratio-controlling current, i.e., the amount of current at which the ratio-controlling valve device is not directing any ratio-controlling pressure to either of the two disk pairs, is usually determined the first time the transmission is run in the test stand and stored in a memory of the electronic control unit of the transmission. However, due to manufacturing tolerances, wear, system drift and other changes affecting the operational parameters of the transmission and its control unit over the course of its operating life, the neutral value of the ratio-controlling current will change. As discussed above, the change in the neutral value of the ratio-controlling current over time has negative consequences for the efficiency of the transmission.

OBJECT OF THE INVENTION

Based on the observation that the change in the neutral value of the ratio-controlling current over time is a root cause of efficiency losses in the transmission, the present invention aims to solve the problem of the efficiency losses by eliminating the root cause.

SUMMARY OF THE INVENTION

To meet the objective just stated, the invention provides a method of improving the efficiency of a continuously variable chain-belt transmission with two pairs of conically tapered disks and a chain belt transmitting torque of a variable magnitude from one to the other of the pairs of conically tapered disks. The chain belt is held tight by compressive contact with the conically tapered disks, with a belt-tightening contact pressure being applied to both pairs of disks dependent on the magnitude of the torque to be transmitted. A ratio-controlling pressure is applied to either one or the other of the pairs of conical disks dependent on a transmission ratio to be set. A pump pressure is generated by a pump and regulated to a pressure level that exceeds the ratio-controlling pressure by a preset amount and at least equals the belt-tightening contact pressure. A ratio-controlling valve device, responsive to a ratio-controlling current that is variable in a continuous range extending above and below a neutral value of the ratio-controlling current, directs the ratio-controlling pressure to one of the pairs of conical disks when the ratio-controlling current is above the neutral value and to the other of the pairs of conical disks when the ratio-controlling current is below the neutral value. The method according to the invention has the following steps:

a) certain relevant operational parameters of the transmission are monitored while the transmission is in actual use;

b) the neutral value of the ratio-controlling current is updated based on the values of the monitored operational parameters.

According to the invention, the neutral value of the ratio-controlling current is updated during the actual use of the transmission. This assures that when the situation calls for a neutral operating mode of the transmission, the ratio-controlling valve does in fact receive a ratio-controlling current of the correct neutral value, so that neither of the two conical disk pairs is unnecessarily subjected to a ratio-controlling pressure. By providing the capability of learning the neutral value, the procedural complexity of determining the value initially on the test stand is reduced. The specific advantage of the inventive method is that the neutral value needs to be determined only for one transmission in a model family.

In an advantageous embodiment of the method according to the invention, the ratio-controlling pressure is monitored while at the same time the ratio-controlling current is being varied until a current value has been found where the ratio-controlling pressure is zero. As soon as this is the case, the current value corresponding to the zero level of the ratio-controlling pressure is retained as the updated neutral value.

In a further advantageous embodiment of the inventive method, the pump pressure is monitored during an operating phase when the torque flowing through the transmission is very small. At the same time, the ratio-controlling current is varied until the pump pressure has reached a minimum. As soon as this is the case, the current value corresponding to the minimum pump pressure is retained as the updated neutral value.

Under a further preferred embodiment, the inventive method can be further enhanced by detecting and storing a functional relationship between the ratio-controlling current and the ratio-controlling pressure in a range above and below the neutral value, so that the stored functional relationship will be available for controlling the transmission ratio. Adding this feature to the inventive method improves the performance of a controller for the ratio-controlling current.

A further improvement of controller performance is achieved in an advantageous embodiment of the inventive method where the functional relationship between the ratio-controlling current and the ratio-controlling pressure is detected and stored for a plurality of different temperature levels.

Also included within the scope of the invention is the apparatus itself by which the object of the invention is attained, i.e., a continuously variable chain-belt transmission with two pairs of conically tapered disks and a chain belt transmitting torque from one to the other of the pairs of conically tapered disks. The chain belt is held tight by compressive contact with the conically tapered disks. Each of the pairs of disks has a first piston/cylinder unit energized by a belt-tightening contact pressure and a second piston/cylinder unit energized by a ratio-controlling pressure. A ratio-controlling valve device directs the ratio-controlling pressure to either one or the other of the pairs of conical disks depending on the ratio that is to be set for the transmission. The ratio-controlling valve device is responsive to a ratio-controlling current that is variable in a continuous range extending above and below a neutral value. When the ratio-controlling current is above the neutral value, the ratio-controlling pressure is directed to one of the pairs of conical disks, and when the ratio-controlling current is below the neutral value, the ratio-controlling pressure is directed to the other of the pairs of conical disks. The transmission further has a torque-sensor device controlling the belt-tightening pressure dependent on the magnitude of the torque to be transmitted, a pump generating a pump pressure, and an offset-pressure valve regulating the pump pressure to a pressure level that exceeds the ratio-controlling pressure by a preset amount and at least equals the belt-tightening contact pressure. The transmission according to the invention is equipped with an electronic control device to which sensors are connected for the monitoring of operational parameters of the transmission. The electronic control device regulates the ratio-controlling current, so that a transmission ratio is set in accordance with a predetermined function of the operational parameters. The electronic control device is equipped with special means for updating the neutral value of the ratio-controlling current in function of the monitored operational parameters.

In an advantageous embodiment of the continuously variable chain-belt transmission, the updating device detects a functional relationship between the ratio-controlling current and the ratio-controlling pressure in a range above and below the neutral value. A memory contained in the electronic control device serves to store the functional relationship, so that it is kept available as input data into control algorithms for setting and shifting the transmission ratio.

In an especially advantageous embodiment of the continuously variable chain-belt transmission, the updating means includes a selector lever, a clutch arranged in the drive train, a clutch-control valve, and a clutch-pressure sensor. The selector lever is movable to a disengaged position where the clutch is disengaged. The clutch-control valve is controlled by the electronic control device by means of a clutch-controlling electric current which, in turn, causes the clutch to be pressurized by a clutch pressure not exceeding the pump pressure. The function of the clutch-pressure sensor is to detect the clutch pressure. The functional concept of this embodiment is that the updating device registers an output signal of the clutch-pressure sensor as a function of the ratio-controlling current during time periods when the selector lever is in the disengaged position and the clutch valve is pressurized by the pump pressure.

The last-mentioned embodiment has the added advantage that it requires no additional sensor to update the neutral value of the ratio-controlling current or to detect the functional relationship between pump pressure and ratio-controlling current.

The novel features that are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

BRIEF DESCRIPTION OF THE DRAWINGS

The following detailed description of the invention is based on the attached drawing, wherein.

DETAILED DESCRIPTION OF THE INVENTION

Figure 1:
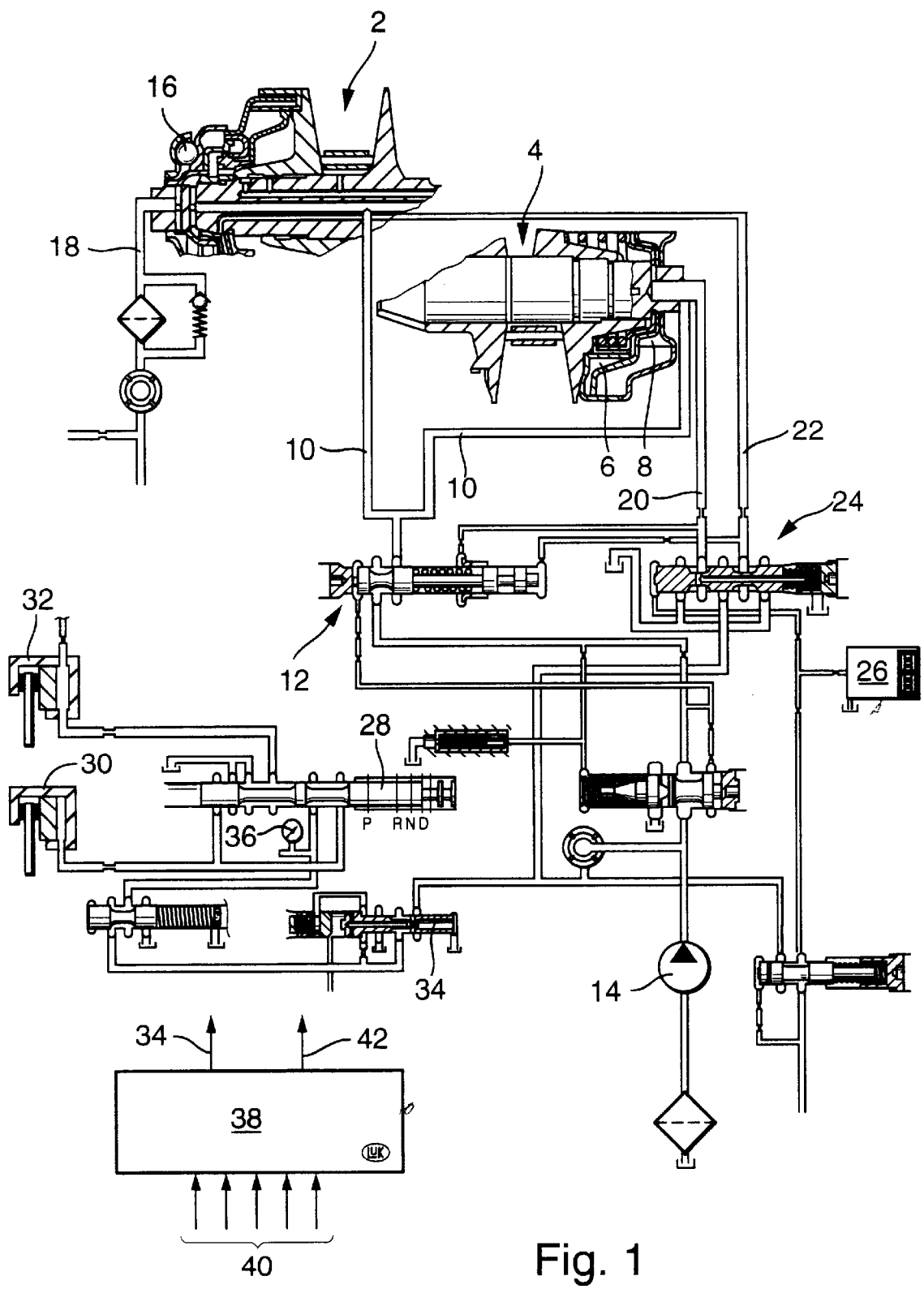
FIG. 1 represents a block diagram of a continuously variable chain-belt transmission.

FIG. 1 illustrates a continuously variable chain-belt transmission with a pair of conical disks 2 on the input side and another pair of conical disks 4 on the output side of the transmission. In each pair, one of the disks is axially movable in relation to the other disk. To perform the axial movement, the movable disk of each pair is equipped with two piston/cylinder units. The working compartment of one of the units functions as a contact pressure chamber 6, while the working compartment of the other piston/cylinder unit functions as a ratio-controlling chamber 8. In FIG. 1, the contact pressure chamber and the ratio-controlling chamber are shown only for the disk pair 4. The contact pressure chambers 6 receive pressure through the conduits 10 which, by way of an offset pressure valve 12, are connected to a pump 14 moving and pressurizing hydraulic fluid out of a reservoir. The conduit 10 connected to the disk pair 2 on the input side of the transmission runs through a torque sensor 16 where a shutter gate connecting the conduit 10 to a drain is increasingly opened in function of a decreasing torque. The shutter gate (not shown in FIG. 1) leads to a drain conduit 18 through which the out-flow of hydraulic fluid is made available for the lubrication and/or cooling of the transmission. The contact pressure chambers 6 of the disk pairs 2 and 4 share the same pressure, due to the direct communication through conduits 10.

The ratio-controlling chambers 8 are supplied with their respective amounts of ratio-controlling pressure through the conduits 20 and 22 which, by way of a ratio-controlling valve 24, are connected to the outlet side of the pump 14. The ratio-controlling valve 24, in turn, is hydraulically controlled by a bias-control valve 26. The ratio-controlling valve 24 and the bias-control valve 26 together constitute a ratio-controlling valve device. The different operating modes of the transmission, i.e., P (park), R (reverse), N (neutral), and D (drive), are shifted by means of a slide valve 28 connected to a shift lever (not shown). A drive clutch 30 and a reverse clutch 32 are controlled through the position of the slide valve 28 by way of a clutch valve 34, the latter being configured as a pressure-reducing valve. The hydraulic pressure on the output side of the clutch valve 34 is monitored by a pressure sensor 36.

The system described above is controlled by an electronic control device 38 containing a microprocessor and associated memory devices. The input leads 40 of the electronic control device 38 are connected to sensors for the monitoring of operating conditions of the transmission or of a drive train that the transmission belongs to. One of the output leads 42 of the electronic control device 38 is connected to the bias-control valve 26, and another output lead 42 is connected to the clutch valve 34.

Figure 2:
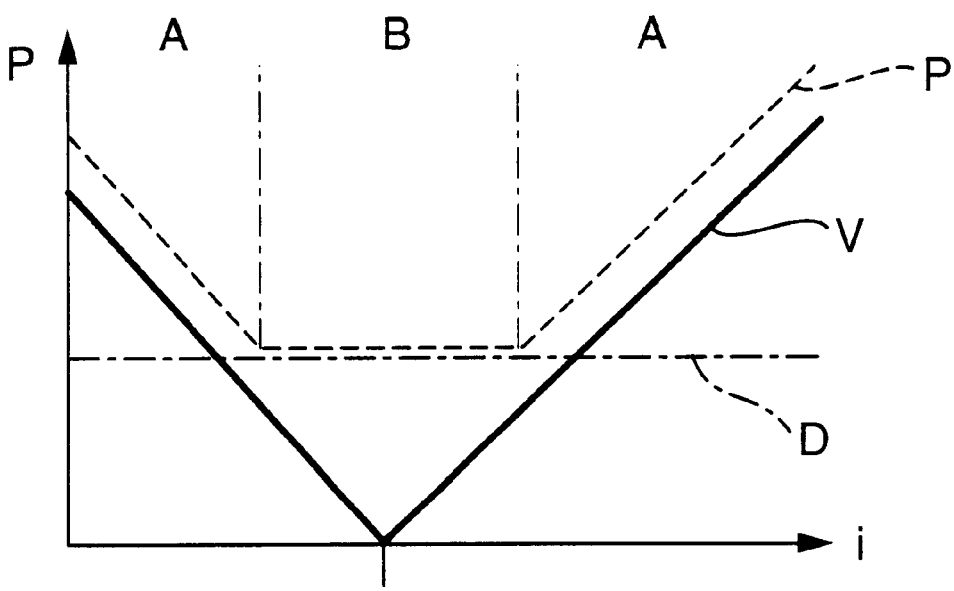
FIGS. 2 and 3 represent graphs showing the ratio-controlling pressure as a function of the ratio-controlling current.
Figure 3:
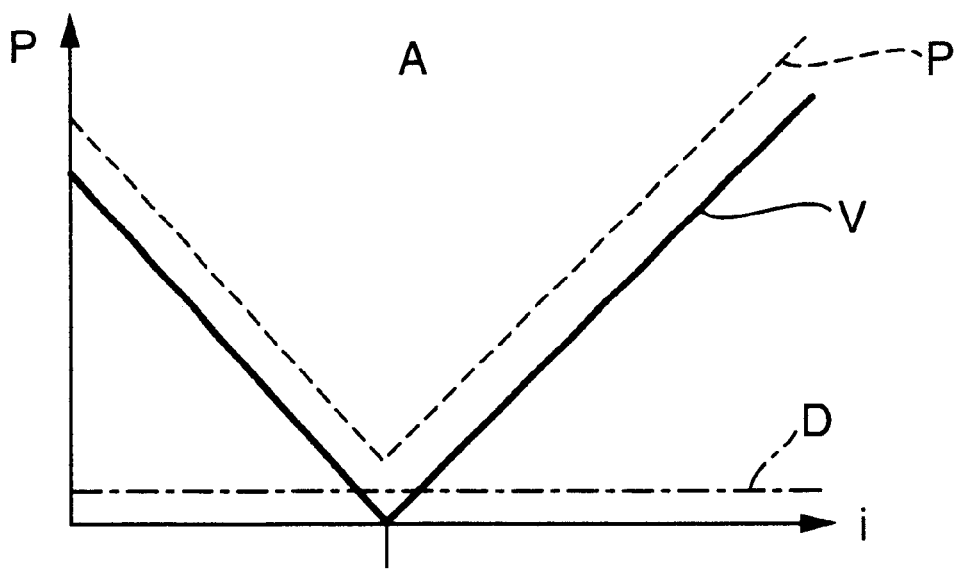

The construction and arrangement of the individual components, of which only those essential to the invention have been named, as well as the design and function for the electronic control device 38 are known per se and will therefore not be explained in detail. The following explanation will go only as far as is essential to the invention:

In the graphs of FIGS. 2 and 3, the ordinate indicates a hydraulic mean pressure p, and the abscissa indicates the controlling current i of the valve.

The solid curve V indicates the ratio-controlling pressure that is present in one of the conduits 20 or 22; the broken line P indicates the pump pressure downstream of the pump 14, and the dash-dotted line D indicates the belt-tightening contact pressure that is present in the conduits 10.

As may be seen in the graphs, FIG. 2 shows the conditions that exist when the contact pressure D is relatively high, whereas FIG. 3 shows the conditions at a low contact pressure D. In the parts A of the range, the pump pressure is controlled by the ratio-controlling valve 24. In the latter valve 24, the ratio-controlling pressure V that is present in one of the conduits 20 or 22 is returned to a piston performing an "OR" function, and the same pressure V acts against the slide piston of the offset pressure valve 12 with an axial force that is additive to the force of a spring. The pump pressure acts on the opposite end surface of the slide piston. This arrangement has the effect that the offset pressure valve 12 controls the pump pressure in such a manner that the pump pressure always exceeds the ratio-controlling pressure by an amount corresponding to the spring force (approximately 6.5 bar). Because the belt-tightening contact pressure D in FIG. 2 is high, the contact pressure in part B of the range (in FIG. 2) exceeds the ratio-controlling pressure by more than 6.5 bar. This condition causes an imbalance of the forces acting on the slide piston of the offset pressure valve 12 in the opening direction, pushing the slide piston to its end stop (open position), so that the pump pressure is substantially equal to the belt-tightening contact pressure.

Under the conditions of FIG. 3 (low belt-tightening contact pressure D, corresponding to a low amount of torque), the conditions for a part B of the range do not occur, so that the pump pressure is always coupled to the profile curve of the ratio-changing pressure.

It is critical for the efficiency of the transmission to know the point NE at which neither of the ratio-controlling chambers is pressurized. NE is the point of departure from which the ratio-controlling pressure is directed to either the input-side disk pair or the output-side disk pair. The profile of the ratio-controlling pressure V, decreasing at first from left to right and then increasing again, corresponds for example to a continuously increasing controlling current in the bias-control valve 26. In order to move the transmission reliably into a state where both ratio-controlling chambers are pressure-free or where, in the absence of contact pressure chambers, both ratio-controlling chambers receive the same pressure, it is important to know the "neutral" value of the controlling current, i.e, the amount of current that has to be applied to the bias-control valve 26 to set the transmission to the 1:1 ratio or neutral state.

There are numerous possibilities for adapting or updating the neutral value of the ratio-controlling current, which can be stored in the form of appropriate algorithms in the electronic control device 38.

One of the possibilities is to monitor the ratio-controlling pressure in one or both of the conduits 20, 22 by means of a pressure sensor and to vary the ratio-controlling current supplied to the bias-control valve 26 until the pressure is found to be at a minimum value, whereupon the ratio-controlling current present at that point is stored as the updated neutral value. The monitoring of the ratio-controlling pressure adds an additional function to the transmission described here and requires at least one additional pressure sensor, increasing the cost and complexity.

As an alternative possibility, the pump pressure P could be registered at low torque levels (low contact pressure D), e.g., in the neutral position of the transmission as set by the slide valve 28, where the pump pressure runs at a parallel offset to the ratio-controlling pressure (See FIG. 3). When a variable ratio-controlling current is applied to the bias-control valve 26, the resulting pump pressure will follow the profile shown in FIG. 3, where the minimum is taken as the neutral value. This method, again, requires an additional pressure sensor to determine the neutral value of the controlling current.

As a further possibility, one could use the pressure sensor 36 that serves to monitor the hydraulic pressure on the output side of the clutch valve 34. The clutch valve 34 is directed by the electronic control device to set a clutch pressure that is smaller or at most equal to the pump pressure. If, at a time when the pump pressure is relatively low, the controlling current of the clutch valve 34 is set (by means of an appropriate algorithm of the electronic control device 38) to a level that would call for a clutch pressure higher than the pump pressure, the pump pressure present at that time can be detected by means of the pressure sensor 36. However, using a measurement of this kind to update the neutral value NE is possible only at a time when the shift selector lever, or the slide piston of the slide valve 28, is in one of the positions P (Park) or N (Neutral), because this is when the conditions of FIG. 3 (low torque level) are present. When there is an activity at the selector lever, the adaptation process has to be canceled immediately, and the controlling current of the clutch valve has to be brought to the usual value that exists when the vehicle is standing still. The method just described does not require an additional sensor and offers a simple way of learning the neutral value of the ratio-controlling current that has to be applied to the bias-control valve 26 so that neither of the ratio-controlling chambers is receiving pressure (position NE in FIGS. 2 and 3).

The ratio-controlling current of the bias-control valve 26 that is required for the position NE is in general of the order of 450 mA. The valve characteristic is typified by a V-shaped profile where, according to the nature of the valve function, it is possible to have a dead zone around zero or a range where the relationship in which the ratio-controlling pressure depends on the ratio-controlling current is changed. This change in the dependent relationship is of concern in the design of the controller that regulates the controlling current of the valve 26, e.g., as a function of the torque level and an rpm rate or other operating parameters. The design characteristic of the controller function around the point NE cannot be optimized because of the aforementioned reason, which leads to inferior controller properties in the intrinsic control behavior and in the response to extraneous disturbances.

The method described above of determining the current at the point NE can be used in a simple way to detect and store the characteristic of the valves 24 and 26 (i.e., the controlling current as a function of the ratio-controlling pressure or of the transmission ratio itself). If the controlling current at the point NE is, e.g., 450 mA, the characteristic curve can be registered, e.g., in a range from 400 to 500 mA. It is useful to take passes in both directions (i.e., from 400 mA to 500 mA and from 500 mA to 400 mA) in order to cover the entire hysteresis and to find a mean operating point NE. As a valve characteristic, it is possible to use a mean characteristic as can be obtained, e.g., from acceptance test programs that are performed on a test stand. The inverse characteristic can be used for the correction of coefficients of the ratio-controlling algorithm when the control is in the corresponding current range. It is useful to standardize the slope of the stored characteristic so that it equals 1 at the ends of the covered range. Should the characteristic be very flat in the immediate vicinity of the point NE, it can be advantageous to use a set minimum value for the slope factor within that vicinity to prevent the inverse value from becoming too large.

With higher temperature levels, the pressure range of the ratio-controlling valve 24 generally becomes smaller, and the slope values of the valve characteristic, likewise, become smaller. It is therefore advantageous if, instead of only one characteristic curve, an entire characteristic curve field is used (i.e., stored), indicating the ratio-controlling current as a function of temperature and as a function of the pressure or the transmission ratio.

In practice, a valve characteristic can be determined by using a pressure sensor 36, as follows.

With the slide piston in one of the positions P (Park) or N (Neutral), the clutch valve is subjected to a clutch-controlling current of 1000 mA. The return conduit of the clutch valve 34 (and of the slide valve 28) is closed off, meaning that the pressure sensor 36 will measure the pump pressure or system pressure. As explained above, the system pressure at low torque levels is determined by the ratio-controlling valve 24 and thus by the controlling current of the bias-control valve 26.

The low point of the pump characteristic P (which corresponds to the system-pressure characteristic) can be found by varying the controlling current of the bias-control valve 26, e.g., between 400 and 500 mA. This procedure allows the characteristic to be standardized and determined in the vicinity of the point NE and to be stored subsequently. Instead of a single characteristic curve, a field of curves can be determined and stored in the case where the temperature is taken into account as an additional parameter.

If the measured valve characteristic covers a wide pressure range, it can be advantageous to skip over certain parts of the current range. For example, if the characteristic indicates no pressure change between 430 mA and 470 mA, it can be advantageous to skip over this interval and to avoid those parts of the range where the gain factor is zero.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforedescribed contribution to the art and, therefore, such adaptations should and are intended to be comprehended within the meaning and range of equivalence of the appended claims.

What is claimed is:

1. A method of improving the efficiency of a continuously variable chain-belt transmission with two pairs of conically tapered disks and a chain belt transmitting torque of a variable magnitude from one to the other of the pairs of conically tapered disks, the chain belt being held tight by compressive contact with the conically tapered disks, a belt-tightening contact pressure being applied to both pairs of disks dependent on the magnitude of the torque to be transmitted, a ratio-controlling pressure being applied to one of the pairs of conical disks dependent on a transmission ratio to be set, a pump pressure being generated by a pump and regulated to a pressure level that exceeds the ratio-controlling pressure by a preset amount and at least equals the belt-tightening contact pressure, a ratio-controlling valve device being responsive to a ratio-controlling current that is variable in a continuous range extending above and below a neutral value of the ratio-controlling current, so that the ratio-controlling valve directs the ratio-controlling pressure to one of the pairs of conical disks when the ratio-controlling current is above the neutral value and to the other of the pairs of conical disks when the ratio-controlling current is below the neutral value, the method comprising the following steps:

a) monitoring of values of operational parameters of the transmission while the transmission is in actual use;

b) updating of the neutral value of the ratio-controlling current based on the values of the monitored operational parameters.

2. The method of claim 1, wherein under step a) the monitored operational parameter is the ratio-controlling pressure and further, the ratio-controlling current is being varied until a value of the ratio-controlling current has been found where the ratio-controlling pressure is zero; and under step b) said value of the ratio-controlling current is retained as the updated neutral value.

3. The method of claim 1, wherein under step a) the monitored operational parameter is the pump pressure and the monitoring is performed when the magnitude of the torque is very small and further, the ratio-controlling current is being varied until a value of the ratio-controlling current has been found where the pump pressure is at a minimum level; and under step b) said value of the ratio-controlling current is retained as the updated neutral value.

4. The method according to claim 2, wherein further a functional relationship between the ratio-controlling current and the ratio-controlling pressure within a range above and below the neutral value is detected and stored, so as to keep said functional relationship available for controlling the transmission ratio.

5. The method according to claim 3, wherein further a functional relationship between the ratio-controlling current and the ratio-controlling pressure within a range above and below the neutral value is detected and stored, so as to keep said functional relationship available for controlling the transmission ratio.

6. The method according to claim 4, wherein said functional relationship is detected and stored for a plurality of different temperature levels.

7. The method according to claim 5, wherein said functional relationship is detected and stored for a plurality of different temperature levels.

8. A continuously variable chain-belt transmission in a drive train of a motor vehicle, comprising two pairs of conically tapered disks, a chain belt transmitting torque from one to the other of the pairs of conically tapered disks, the chain belt being held tight by compressive contact with the conically tapered disks, at each of the pairs of disks, one first piston/cylinder unit energized by a belt-tightening contact pressure, also at each of the pairs of disks, a second piston/cylinder unit energized by a ratio-controlling pressure, a ratio-controlling valve device directing the ratio-controlling pressure to one of the pairs of conical disks, said ratio-controlling valve device being responsive to a ratio-controlling current that is variable in a continuous range extending above and below a neutral value of the ratio-controlling current, so that the ratio-controlling pressure is directed to one of the pairs of conical disks when the ratio-controlling current is above the neutral value and to the other of the pairs of conical disks when the ratio-controlling current is below the neutral value, a torque-sensor device controlling the belt-tightening pressure dependent on the magnitude of the torque to be transmitted, a pump generating a pump pressure, an offset-pressure valve regulating the pump pressure to a pressure level that exceeds the ratio-controlling pressure by a preset amount and at least equals the belt-tightening contact pressure, an electronic control device as well as sensors connected to the electronic control device for monitoring of operational parameters of the transmission, the electronic control device regulating the ratio-controlling current so that a transmission ratio is set in accordance with a predetermined function of the operational parameters, and an updating means for updating the neutral value of the ratio-controlling current in function of the monitored operational parameters.

9. The continuously variable chain-belt transmission of claim 8, wherein the updating means detects a functional relationship between the ratio-controlling current and the ratio-controlling pressure in a range above and below the neutral value, and the electronic control device comprises a memory in which said functional relationship is stored and kept available as input data into control algorithms for setting and shifting the transmission ratio.

10. The continuously variable chain-belt transmission of claim 8, wherein the updating means comprises a selector lever, a clutch arranged in the drive train, a clutch-control valve, and a clutch-pressure sensor; the selector lever being movable to a disengaged position where the clutch is disengaged; the clutch-control valve being controlled by the electronic control device by means of a clutch-controlling electric current; said clutch-controlling current causing the clutch to be pressurized by a clutch pressure not exceeding the pump pressure; the clutch-pressure sensor serving to detect the clutch pressure; and wherein further the updating device registers an output signal of the clutch-pressure sensor as a function of the ratio-controlling current during time periods when the selector lever is in the disengaged position and the clutch valve is pressurized by the pump pressure.

* * * * *